(12) United States Patent  
Urano (10) Patent No.: US 10,084,351 B2  
(45) Date of Patent: Sep. 25, 2018

(54) POWER FEEDING DEVICE

(71) Applicant: TDK CORPORATION, Tokyo (JP)

(72) Inventor: Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 302 days.

(21) Appl. No.: 14/707,706

(22) Filed: May 8, 2015

(65) Prior Publication Data

US 2015/0333531 A1   Nov. 19, 2015

(30) Foreign Application Priority Data

May 19, 2014 (JP) ................................. 2014-103044  
Apr. 23, 2015 (JP) ................................. 2015-088194

(51) Int. Cl.
| | | |
|---|---|---|
| H01F 38/00 | (2006.01) | |
| H02J 50/90 | (2016.01) | |
| H02J 5/00 | (2016.01) | |
| H02J 7/02 | (2016.01) | |
| H02J 50/12 | (2016.01) | |
| H02J 50/40 | (2016.01) | |
| H02J 7/00 | (2006.01) | |
| H02J 50/10 | (2016.01) | |

(52) U.S. Cl.  
CPC .............. *H02J 50/90* (2016.02); *H02J 5/005* (2013.01); *H02J 7/0042* (2013.01); *H02J 7/025* (2013.01); *H02J 50/10* (2016.02); *H02J 50/12* (2016.02); *H02J 50/40* (2016.02)

(58) Field of Classification Search  
CPC .......... H02J 7/0042; H02J 50/10; H02J 5/005; H02J 7/025

USPC ........................................................ 307/104  
See application file for complete search history.

(56) References Cited

U.S. PATENT DOCUMENTS

| | | |
|---|---|---|
| 8,305,036 B2 | 11/2012 | Toya et al. |
| 8,664,914 B2 | 3/2014 | Toya et al. |
| 8,786,252 B2 | 7/2014 | Toya et al. |
| 2009/0096413 A1* | 4/2009 | Partovi ................. H01F 5/003 320/108 |
| 2009/0153098 A1 | 6/2009 | Toya et al. |
| 2010/0181841 A1* | 7/2010 | Azancot ................ H01F 38/14 307/104 |
| 2013/0009596 A1 | 1/2013 | Toya et al. |

(Continued)

FOREIGN PATENT DOCUMENTS

JP    2014064460 A    4/2014

*Primary Examiner* — Alfonso Perez Borroto  
(74) *Attorney, Agent, or Firm* — Oliff PLC (57) ABSTRACT

A power feeding device reduced unnecessary power consumption, a high response before the start of transmission of power to a power receiving device, and an expanded power feeding area (or placement range) within which power can be transmitted to the power receiving device. A power feeding device stand for wireless transmission of power to a power receiving device including a power receiving coil includes a magnetic body formed into a flat plate shape and having two main surfaces, and a power feeding coil that is arranged at a certain position on either of the main surfaces. In power transmission, the power feeding coil is arranged at a certain position on either of the main surfaces, and the power receiving coil is arranged at a different position on either of the main surfaces from the position at which the power feeding coil is arranged.

6 Claims, 9 Drawing Sheets

(56) References Cited

U.S. PATENT DOCUMENTS

2014/0028253 A1 1/2014 Toya et al.
2014/0285144 A1 9/2014 Toya et al.

* cited by examiner

POWER FEEDING DEVICE

BACKGROUND

The present invention relates to a power feeding device.

Increasing attention is being paid to contactless power transmission technology for supplying power without using a power cord. Contactless power transmission technology enables contactless power supply from the power feeding side to the power receiving side, and is thus expected to be applied to a variety of products, examples of which include transportation devices such as in trains and electric vehicles, home electric appliances, electronic devices, wireless communication devices, and toys.

In light of such a background, charging stands for charging a battery-containing device containing a battery and an induction coil have been intensely developed. There has been an increasing demand for the development of a charging stand capable of efficiently charging an internal battery regardless of where a battery-containing device is placed on the charging stand to enhance user convenience.

For example, a charging stand for charging a battery-containing device containing a battery and an induction coil is proposed in Patent Literature 1, the charging stand including a power supply coil that induces an electromotive force to the induction coil, a movement mechanism that causes the power supply coil to move, and a position detection controller that detects the position of the induction coil and controls the movement mechanism to cause the power supply coil to approach the induction coil. When a battery-containing device is placed on a top plate of the case of the charging stand, the position of the battery-containing device is detected by the position detection controller. Upon detection of the position of the battery-containing device, the position detection controller controls the movement mechanism to cause the power supply coil to move along the top plate and approach the induction coil of the battery-containing device. Accordingly, a charging stand capable of efficiently charging the internal battery regardless of where the battery-containing device is placed on the top surface of the case of the charging stand is achieved.

PRIOR ART REFERENCES

Patent Reference

[Patent Literature 1] Japanese Unexamined Patent Application Publication No. 2014-64460

SUMMARY

However, the technique disclosed in Patent Literature 1 requires an actuator, such as a servo motor, as a movement mechanism to cause the power supply coil to move, causing a problem in that power may be consumed for purposes other than contactless power transmission for which it is intended. In the technique disclosed in Patent Literature 1, furthermore, there is also a problem in that since the position detection controller detects the position of the battery-containing device and then controls the movement mechanism to cause the power supply coil to move so as to approach the induction coil, an amount of time for the power supply coil and the induction coil to be aligned in position is required from the time the battery-containing device is placed on the charging stand to the time charging to the internal battery is started, causing a response speed at the start of charging to be slow.

The present invention has been made in light of the problems described above, and it is an object of the present invention to provide a power feeding device (a power feeding device applicable to a power feeding stand or the like) with reduced unnecessary power consumption, a high response before the start of transmission of power to a power receiving device, and an expanded power feeding area (or placement range) within which power can be transmitted to the power receiving device.

A power feeding device according to the present invention is a power feeding device for wireless transmission of power to a power receiving device including a power receiving coil, including a magnetic body formed into a flat plate shape and having two main surfaces, and a power feeding coil that is arranged at a certain position on either of the two main surfaces, wherein the power receiving coil is arranged at a certain position on either of the two main surfaces during power transmission, and the position at which the power feeding coil is arranged is different from the position at which the power receiving coil is arranged.

According to the present invention, the power feeding coil and the power receiving device are arranged at positions on a main surface of the magnetic body. Thus, a magnetic flux generated from the power feeding coil flows into the magnetic body from the location where the power feeding coil is arranged, and circulates so that the magnetic flux is radiated into the air from the entire surface of the magnetic body and reaches (or returns to) the power feeding coil. In this case, a power feeding area (or a placement surface) is formed within an area other than the location on the main surface of the magnetic body where the power feeding coil is arranged. Further, when the power receiving device is placed (or arranged) within the placement surface (or power feeding area) defined on the main surface of the magnetic body, the magnetic flux radiated from the surface (or main surface) of the magnetic body is interlinked with the power receiving coil included in the power receiving device, and an induced electromotive force is produced. Accordingly, placing (or arranging) the power receiving device on the placement surface (or power feeding area) of the magnetic body results in the immediate start of transmission of power to the power receiving device without causing an actuator to move the power feeding coil. In consequence, unnecessary power consumption (power consumption by the actuator) can be suppressed, and response before the start of transmission of power to the power receiving device can be increased.

In the power feeding device according to the present invention, furthermore, the power receiving coil is arranged at a certain position on either of the two main surfaces of the magnetic body, and the position at which the power feeding coil is arranged is different from the position at which the power receiving coil is arranged. That is, the power receiving coil is arranged at a certain position other than the location on either of the two main surfaces of the magnetic body where the power feeding coil is arranged, and the area of a placement surface (or the area of a region where the power receiving device (or power receiving coil) can be arranged on the main surface) is larger than the area of an installation surface (the area of a portion on the main surfaces where the power feeding coil is to be arranged). This can increase the flexibility with which the power receiving device (or power receiving coil) is placed (or arranged) on the main surface of the magnetic body, and can expand a power feeding area (or placement range) within which power can be transmitted to the power receiving device.

Further, preferably, the power feeding coil includes an insulation-coated conductor wound therearound. This can prevent short-circuit of the power feeding coil, and can also ensure insulation between the power feeding coil and the magnetic body.

The power feeding coil is preferably removable from the magnetic body. In this case, the position of the location where the power feeding coil is to be installed (or arranged) can be changed to any location on a main surface of the magnetic body. That is, changing the location where the power feeding coil is to be installed (or arranged) can change a power feeding area (or placement range). Accordingly, it is possible to change the power feeding area (or placement range) where the power receiving device (or power receiving coil) can be placed (or arranged), as desired for purposes, improving the convenience of use of the power feeding device. In addition, the power to be fed into the power feeding area (or placement range) varies with the distance from the location where the power feeding coil is installed (or arranged). Thus, changing the location where the power feeding coil is installed (or arranged) can also change the power to be fed. Accordingly, it is possible to change the power to be fed into the power feeding area (or placement range), as desired for purposes, improving convenience.

Further, preferably, the magnetic body includes an insulating film that coats an outer surface of the magnetic body. In this case, insulation between the power feeding coil and the magnetic body can be ensured.

Preferably, the power feeding coil is arranged on a main surface that is identical to a main surface of the magnetic body on which the power receiving coil is arranged. In this case, the relative positional relationship between the power feeding coil and the power receiving coil can be more easily changed.

Preferably, the power feeding coil is arranged so that a central axis thereof is substantially perpendicular to the main surfaces of the magnetic body. In this case, a magnetic flux generated from the power feeding coil can be caused to more efficiently flow into the magnetic body.

According to the present invention, it is possible to provide a power feeding device (a power feeding device applicable to a power feeding stand or the like) with reduced unnecessary power consumption, a high response before the start of transmission of power to a power receiving device, and an expanded power feeding area (or placement range) within which power can be transmitted to the power receiving device.

DETAILED DESCRIPTION OF EMBODIMENTS

Modes for carrying out of the present invention (embodiments) will be described in detail with reference to the drawings. In the following description, the same elements or elements having the same functions are denoted by the same numerals, and redundant description thereof is omitted.

Figure 1:
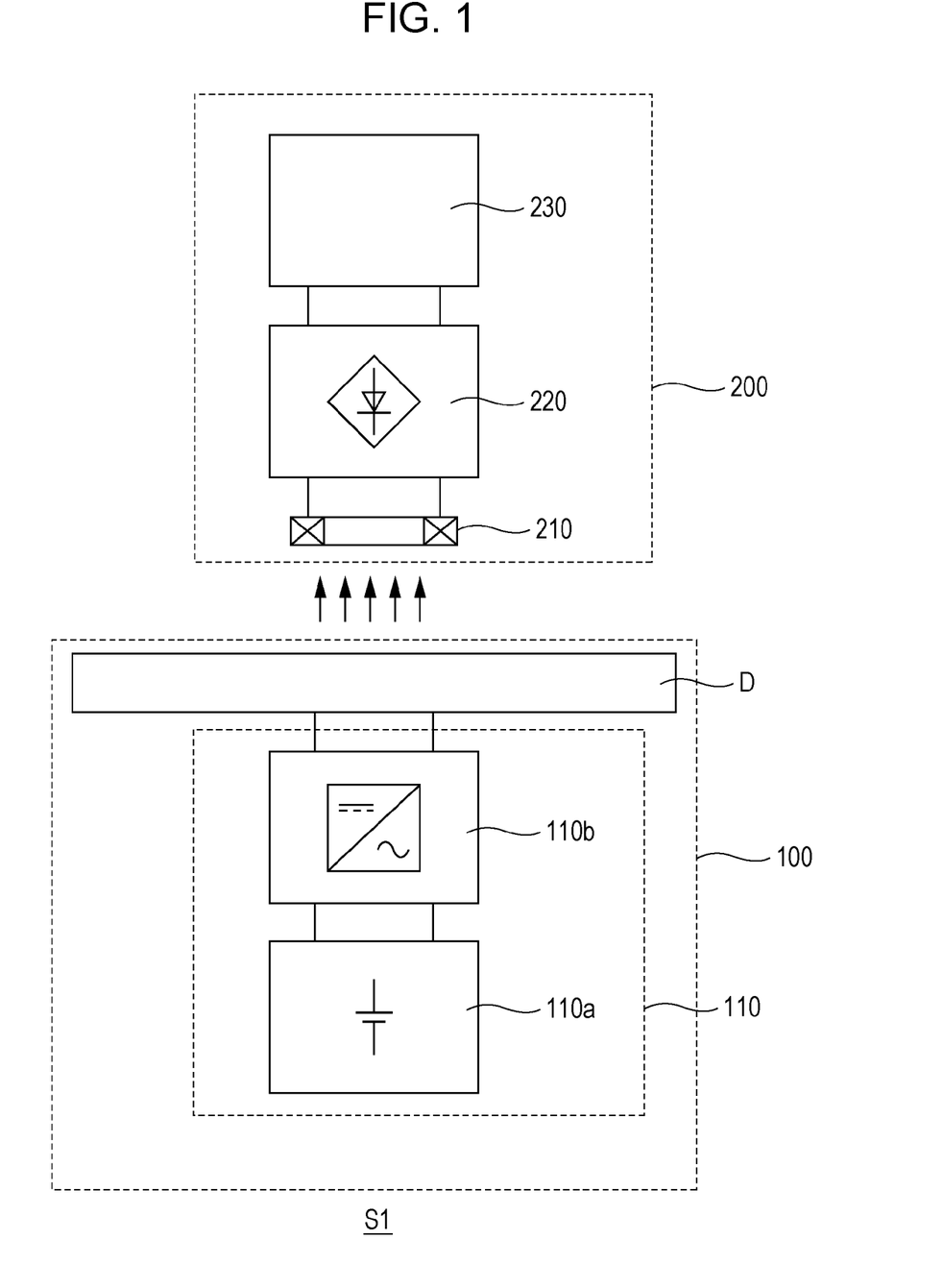
FIG. 1 is a schematic diagram illustrating a contactless power transmission device to which a power feeding stand according to a preferred embodiment of the present invention is applied.

A power feeding device according to the present invention has diverse application fields, and a preferred embodiment thereof may provide a power feeding stand. An overall configuration of a contactless power transmission device S1 to which a power feeding stand according to a preferred embodiment of the present invention is applied will first be described with reference to FIG. 1. FIG. 1 is a schematic diagram illustrating a contactless power transmission device to which a power feeding stand according to a preferred embodiment of the present invention is applied.

As illustrated in FIG. 1, the contactless power transmission device S1 includes a power feeding device 100 and a power receiving device 200.

First, the power feeding device 100 will be described. The power feeding device 100 includes a power source section 110 and a power feeding stand D.

The power source section 110 includes a power source 110*a* and a power conversion circuit 110*b*. The power source 110*a* supplies direct-current power to the power conversion circuit 110*b*. The power source 110*a* is not limited to any particular one, and may be any power source that outputs direct-current power. Examples of such a power source include a direct-current power source that is produced by rectifying and smoothing a commercial alternating-current power source, a secondary battery, and a solar photovoltaic direct-current power source.

The power conversion circuit 110*b* has a function of converting direct-current power into alternating-current power. That is, the power conversion circuit 110*b* serves as an inverter. The power conversion circuit 110*b* is implemented as a switching circuit having a plurality of bridge-connected switching elements. Examples of the power conversion circuit 110*b* include a full-bridge circuit and a half-bridge circuit.

The power feeding stand D includes a flat-plate-shaped magnetic body having two main surfaces, and a power feeding coil at a certain position on either of the main surfaces, and serves as a power feeding section for contactless (or wireless) transmission of the alternating-current power supplied from the power conversion circuit 110*b* to the power receiving device 200 described below. A specific configuration of the power feeding stand D will be described below.

Then, the power receiving device 200 will be described. The power receiving device 200 includes a power receiving coil 210, a rectifier circuit 220, and a load 230.

The power receiving coil 210 is arranged at a certain position on a main surface of the magnetic body included in the power feeding stand D during power transmission. When the power receiving coil 210 is arranged in the manner described above, a magnetic flux generated by the power feeding coil is interlinked with the power receiving coil 210 via the magnetic body. In this case, the power receiving coil 210 serves as a power receiving section that receives the transmitted alternating-current power. The power receiving coil 210 includes a conductor wire wound therearound, and has two opposing coil surfaces, each of which has a planar shape. That is, the power receiving coil 210 is a so-called planar spiral coil. Examples of the conductor wire forming the power receiving coil 210 include a Litz wire formed by twisting a large number of metal wires such as copper, silver, gold, or aluminum wires. Further, the number of turns of the conductor wire of the power receiving coil 210 is appropriately set in accordance with the desired power transmission efficiency or the like. Note that the power receiving device 200 may further include a power receiving side resonant capacitor (not illustrated) that is connected to the power receiving coil 210 to form a resonant circuit. Examples of the power receiving side resonant capacitor include a low-dielectric-constant capacitor having a low dielectric loss tangent tan δ for an improvement in power transmission efficiency.

The rectifier circuit 220 rectifies the alternating-current power received by the power receiving coil 210, and outputs the resulting power to the load 230. The rectifier circuit 220 includes, for example, a bridge diode and a smoothing capacitor, both of which are not illustrated. Specifically, the alternating-current voltage output from the power receiving coil 210 is full-wave rectified by the bridge diode, and the full-wave rectified voltage is then smoothed by the smoothing capacitor.

The load 230 is connected to the rectifier circuit 220, and is charged by the direct-current power output from the rectifier circuit 220. Examples of the load 230 include rechargeable secondary batteries (such as a lithium ion battery, a lithium polymer battery, and a nickel hydrogen battery).

With the configuration described above, a contactless power feeding device S1 for contactless (or wireless) transmission of power from the power feeding stand D of the power feeding device 100 to the power receiving coil 210 of the power receiving device 200 is achieved.

First Embodiment

Figure 2:
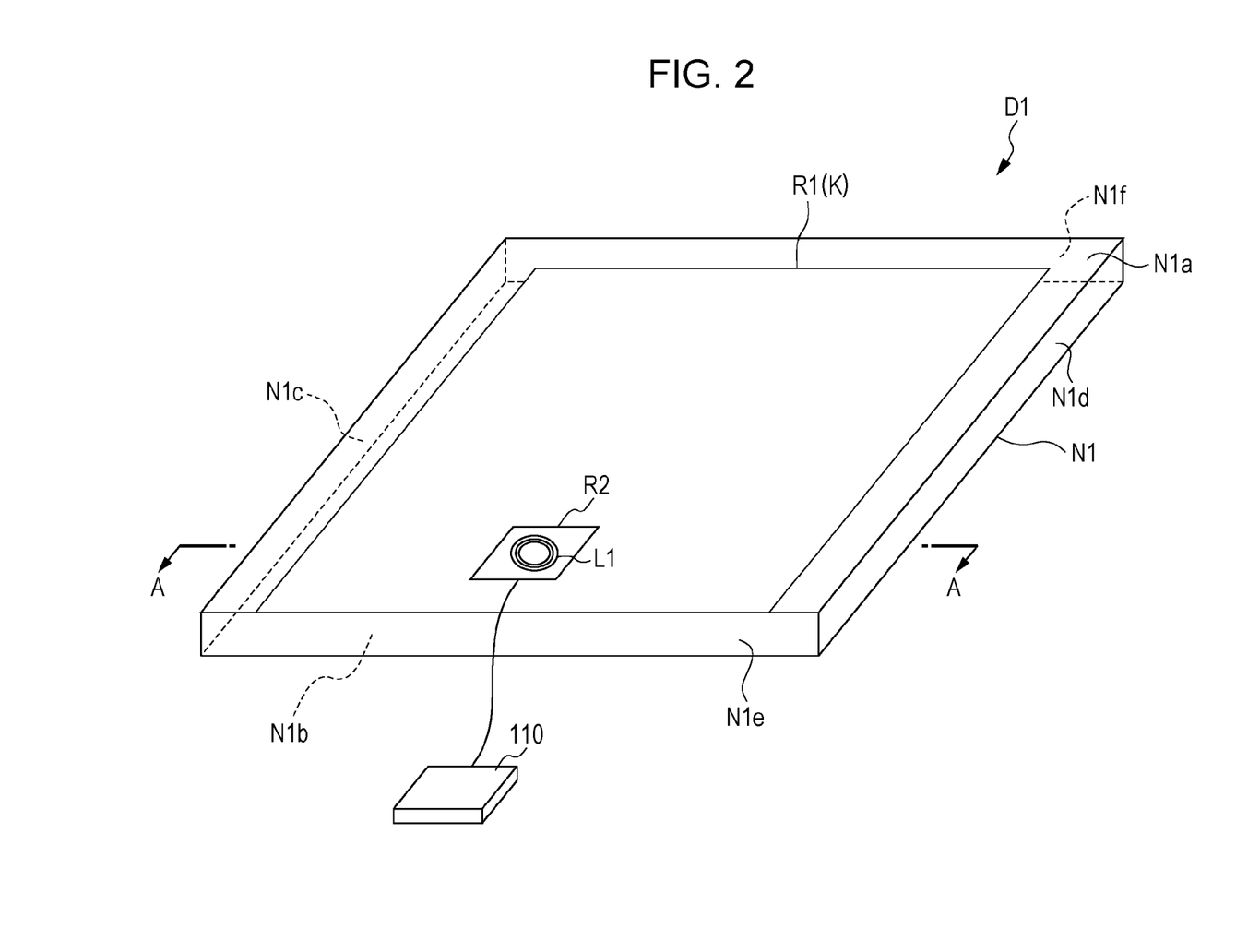
FIG. 2 is a perspective view of a power feeding stand according to a first embodiment of the present invention and a power source section.
Figure 3:
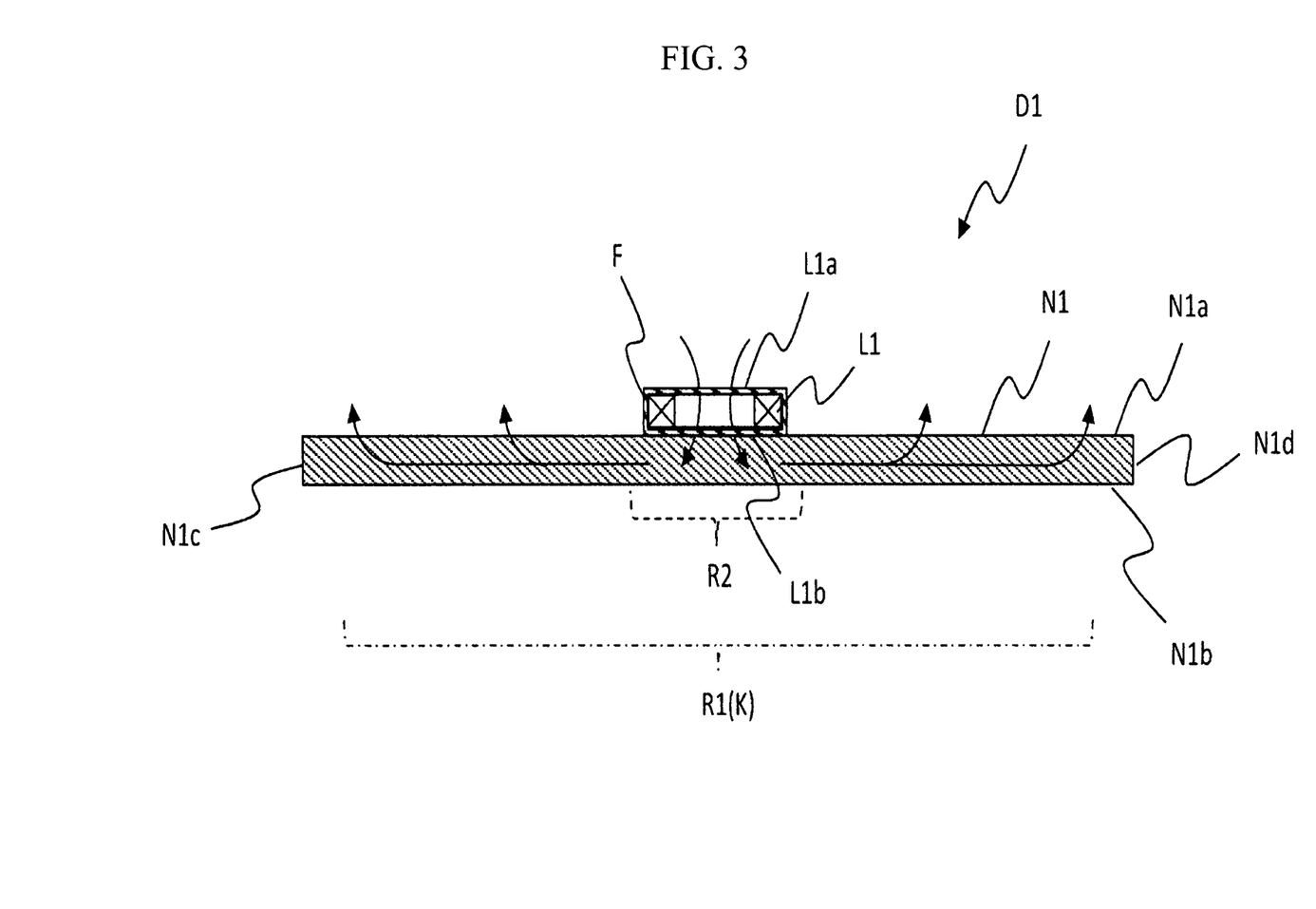
FIG. 3 is a cross-sectional view of the power feeding stand taken along the line A-A in FIG. 2.

Next, the configuration of a power feeding stand D1 according to a first embodiment of the present invention will be described with reference to FIGS. 2 and 3. FIG. 2 is a perspective view of the power feeding stand according to the first embodiment of the present invention and a power source section. FIG. 3 is a cross-sectional view of the power feeding stand D1 taken along the line A-A in FIG. 2. In FIG. 3, a typical magnetic flux generated from a power feeding coil L1 is indicated by an arrow.

As illustrated in FIG. 2, the power feeding stand D1 includes a magnetic plate (flat-plate-shaped magnetic body) N1 and the power feeding coil L1.

The magnetic plate N1 is composed of a magnetic body formed into a flat plate shape. Examples of the magnetic body forming the magnetic plate N1 include a ferrite, a permalloy, and a silicon steel plate. The higher the relative magnetic permeability, the more preferable the magnetic body is. A magnetic body with a relative magnetic permeability greater than or equal to 1000 is preferably used. The reason for this is that the higher the relative magnetic permeability to air, the more efficiently a magnetic flux generated by the power feeding coil L1, described below, travels through the magnetic plate N1, resulting in improved power transmission efficiency. Further, it is desirable that the magnetic plate N1 be a magnetic body having a low core loss, which is selected in accordance with the frequency of the alternating-current current supplied from the power conversion circuit 110b to the power feeding coil L1 described below. The reason for this is that, the lower the core loss, the more the heat generated by the magnetic plate N1 can be suppressed. For example, in a case where the frequency of the alternating-current current supplied from the power conversion circuit 110b to the power feeding coil L1 described below ranges from several kilohertz (kHz) to several tens of kilohertz (kHz), it is preferable that the magnetic plate N1 be composed of a ferrite. In a case where the frequency of the alternating-current current supplied from the power conversion circuit 110b to the power feeding coil L1 described below is equal to the commercial frequency, it is preferable that the magnetic plate N1 be composed of a silicon steel plate. In this embodiment, the magnetic plate N1 is formed of a single-plate magnetic body. However, this is not meant to be limiting, and the magnetic plate N1 may be formed by connecting magnetic pieces. As illustrated in FIG. 2, the magnetic plate N1 has a substantially rectangular parallelepiped outer geometry, and has, as surfaces thereof, first and second opposing main surfaces N1a and N1b, first and second opposing side surfaces N1c and N1d, and third and fourth opposing side surfaces N1e and N1f. The first and second side surfaces N1c and N1d extend in the left-right direction in the drawing, connecting the first and second main surfaces N1a and N1b. The third and fourth side surfaces N1e and N1f extend in a direction away from the viewer as seen in the drawing, connecting the first and second main surfaces N1a and N1b.

The magnetic plate N1 also has a placement surface R1 where the power receiving device 200 (or the power receiving coil 210) is to be placed (or arranged), and an installation surface R2 where the power feeding coil L1 described below is to be installed (or arranged). Here, the "placement surface R1 of the magnetic plate N1 where the power receiving device 200 (or the power receiving coil 210) is to be placed (or arranged)" refers to an area on a main surface of the magnetic plate N1 within which the power receiving device 200 (or the power receiving coil 210) can be directly or indirectly placed (or arranged), and refers to, in a case where the magnetic plate N1 is configured to be accommodated in a protective cover or a housing (not illustrated), an area on the outermost surface of the protective cover or housing. In this embodiment, for convenience of illustration, the power receiving device 200 is directly placed (or arranged) on the magnetic plate N1, by way of example. Specifically, as illustrated in FIG. 2, the placement surface R1 is defined and formed on the first main surface N1a of the magnetic plate N1, and the installation surface R2 is defined and formed within the placement surface R1 on the first main surface N1a of the magnetic plate N1. That is, the installation surface R2 is disposed so as to overlap the placement surface R1 when viewed in the direction in which the first and second main surfaces N1a and N1b of the magnetic plate N1 face. Note that when the power feeding coil L1 is installed (or arranged) at a certain position within the installation surface R2 defined and formed on the first main surface N1a of the magnetic plate N1, the power receiving device 200 (or the power receiving coil 210) is arranged at a position different from the position at which the power feeding coil L1 is arranged within the placement surface R1 defined and formed on the first main surface N1a of the magnetic plate N1. That is, the power receiving device 200 (or the power receiving coil 210) is arranged at a certain position other than the location where the power feeding coil L1 is arranged on a main surface of the magnetic plate N1. Here, it is desirable that, as in this embodiment, the power feeding coil L1 be arranged on the same main surface as the main surface of the magnetic plate N1 on which the power receiving device 200 (or the power receiving coil 210) is arranged. In this case, the relative positional relationship between the power feeding coil L1 and the power receiving coil 210 can be more easily changed. In this embodiment, the placement surface R1 has a larger area than the installation surface R2. That is, it is possible for the power receiving device 200 (or the power receiving coil 210) to be placed (or arranged) within a wide range on the first main surface N1a of the magnetic plate N1. The area of the installation surface R2 is preferably set to $\frac{1}{3}$ or less the area of the placement surface R1. Setting the area of the installation surface R2 to $\frac{1}{3}$ or less the area of the placement surface R1 can make large a power feeding area (or placement range) that is a range (or an area) within which the power receiving device 200 (or the power receiving coil 210) can be arranged, and can reduce the size of the power feeding coil L1 described below to be installed (or arranged) on the installation surface R2. In this embodiment, the installation surface R2 is located on the first main surface N1a of the magnetic plate N1, which is the same main surface as that on which the placement surface R1 is located. However, this is not meant to be limiting, and the installation surface R2 may be located on a surface different from the surface (the first main surface N1a) on which the placement surface R1 of the magnetic plate N1 is located. For example, the installation surface R2 may be located on the second main surface N1b or any of the first to fourth side surfaces N1c to N1f of the magnetic plate N1. In this case, the power receiving device 200 (or the power receiving coil 210) can be placed (or arranged) throughout the first main surface N1a of the magnetic plate N1, resulting in an increase in the power feeding area (or placement range) within which power can be transmitted to the power receiving device 200. Here, the "area of the installation surface R2" refers to an area covered by the power feeding coil L1, described below, which is installed (or arranged) on the magnetic plate N1, and the "area of the placement surface R1" refers to an area on the magnetic plate N1 within which power can be transmitted to the power receiving coil 210 included in the power receiving device 200 when the power receiving device 200 (or the power receiving coil 210) is placed (or arranged) on the magnetic plate N1.

As illustrated in FIGS. 2 and 3, the power feeding coil L1 includes a conductor wire wound therearound, and has two opposing coil surfaces L1a and L1b, each of which has a planar shape. That is, the power feeding coil L1 is a so-called planar spiral coil. Examples of the conductor wire forming the power feeding coil L1 include a Litz wire formed by twisting a large number of metal wires such as copper, silver, gold, or aluminum wires. Further, the number of turns of the conductor wire of the power feeding coil L1 is appropriately set in accordance with the desired power transmission efficiency or the like.

Further, the power feeding coil L1 is installed (or arranged) so that at least one of the two coil surfaces L1a and L1b faces the installation surface R2 of the magnetic plate N1. Specifically, the power feeding coil L1 is installed (or arranged) so that the coil surface L1b of the power feeding coil L1 faces the installation surface R2 of the magnetic plate N1. That is, the power feeding coil L1 is arranged so that the central axis of the power feeding coil L1 is substantially perpendicular to the main surfaces (i.e., the first and second main surfaces N1a and N1b) of the magnetic plate N1. This enables the magnetic flux generated from the power feeding coil L1 to more efficiently flow into the magnetic plate N1. Here, since the area of the installation surface R2 is smaller than that of the placement surface R1, the size of the power feeding coil L1 to be installed (or arranged) on the installation surface R2 is also smaller than that of the placement surface R1. In this embodiment, the power feeding coil L1 is installed so that the coil surface L1b of the power feeding coil L1 comes into contact with the installation surface R2 of the magnetic plate N1. That is, the coil surface L1a of the power feeding coil L1 is in contact with air, and the coil surface L1b of the power feeding coil L1 is in contact with the magnetic plate N1. This allows a magnetic flux generated in the power feeding coil L1 to flow into the magnetic plate N1 substantially without the intervention of air from the coil surface L1b that is in contact with the magnetic plate N1 and that has much higher magnetic permeability than the coil surface L1a that is in contact air and that has low magnetic permeability. In this embodiment, the power feeding coil L1 is installed (or arranged) within the installation surface R2 on the first main surface N1a of the magnetic plate N1. However, this is not meant to be limiting. For example, the first main surface N1a of the magnetic plate N1 may have a recess (not illustrated), and the installation surface R2 may be located at the bottom of the recess, where the power feeding coil L1 may be installed. It should be noted that, also in this case, the coil surface L1a of the power feeding coil L1 needs to be in contact with air. In this regard, if the power feeding coil L1 is contained in the magnetic plate N1, a magnetic flux generated from the power feeding coil L1 circulates through the shortest path without flowing away within the magnetic plate N1. Accordingly, the power feeding coil L1 needs to be installed on the magnetic plate N1 so that at least one of the two coil surfaces N1a and N1b is in contact with air.

In this embodiment, as illustrated in FIG. 3, the power feeding coil L1 is surrounded by an insulating film F. That is, the power feeding coil L1 is installed on the installation surface R2 with the insulating film F interposed between the power feeding coil L1 and the installation surface R2. In this case, insulation between the power feeding coil L1 and the magnetic plate N1 can be ensured. Examples of the material of the insulating film F include an insulating resin, such as polyimide, having a thickness of about several tens of micrometers (μm). Here, the thickness of the insulating film F is preferably set to less than 1 mm in order to allow smooth flowing of a magnetic flux into the magnetic plate N1 from the power feeding coil L1. In this embodiment, the power feeding coil L1 is surrounded by the insulating film F. However, this is not meant to be limiting, and the magnetic plate N1 may include the insulating film F that coats an outer surface thereof so that the entirety of the magnetic plate N1 is surrounded by the insulating film F. It should be noted that, in this case, it is also necessary that the thickness of the insulating film F be set to less than 1 mm. Alternatively, the power feeding coil L1 may be configured such that an insulation-coated conductor formed by coating a conductor wire of the power feeding coil L1 with an insulator, such as a polyethylene insulated wire or a vinyl insulated wire, is used for winding the power feeding coil L1. It should be noted that, in this case, it is also necessary that the thickness of the insulator be set to less than 1 mm. In addition, the power feeding coil L1 is removable from the installation surface R2 of the magnetic plate N1. That is, the power feeding coil L1 may be installed (or arranged) in any location within a surface where the power feeding coil L1 can be installed (or arranged) on a main surface of the magnetic plate N1. Accordingly, the installation surface R2 can be changed to any location on the magnetic plate N1. That is, changing the location of the installation surface R2 can change the position of a power feeding area K formed within the placement surface R1. Accordingly, it is possible to change the location of the placement surface R1 where the power receiving device 200 (or the power receiving coil 210) is to be placed (or arranged), as desired for purposes, improving convenience. Further, since the amount of power fed into the power feeding area K formed within the placement surface R1 varies with the distance from the installation surface R2, changing the location of the installation surface R2 can also change the amount of power fed into the power feeding area K. Accordingly, it is possible to change the amount of power fed into the power feeding area K formed within the placement surface R1, as desired for purposes, improving convenience.

Subsequently, the magnetic flux generated by the power feeding coil L1 will be described in detail with reference to FIG. 3. When an alternating-current voltage is applied to the power feeding coil L1 from the power source section 110, an alternating-current current based on the alternating-current voltage flows and an alternating-current magnetic field is generated. In addition, as illustrated in FIG. 3, the magnetic flux generated from the power feeding coil L1 flows into the magnetic plate N1 from the coil surface L1b of the power feeding coil L1, and circulates so that the magnetic flux is radiated into the air from every portion on the first main surface N1a of the magnetic plate N1 and reaches the power feeding coil L1. In this case, since the magnetic plate N1 is composed of a material having much higher relative magnetic permeability than air, the magnetic flux generated from the power feeding coil L1 spreads away along the magnetic plate N1. Accordingly, the power feeding area K is formed on the first main surface N1a of the magnetic plate N1 in such a manner that power is transmitted over a wide range. That is, the power feeding area K serves as a range over which power can be transmitted to the power receiving device 200. In this embodiment, the range of the power feeding area K is set as the placement surface R1 of the magnetic plate N1. Thus, power transmission is achieved regardless of where the power receiving device 200 (or the power receiving coil 210) is placed (or arranged) within the placement surface R1 of the magnetic plate N1. In this embodiment, the placement surface R1 of the magnetic plate N1 is set to be the same as the range of the power feeding area K. Alternatively, the placement surface R1 may be smaller as long as it can be located within the range of the power feeding area K.

As described above, as a result of the inventor's research, in this embodiment, power transmission is performed regardless of where the power receiving device 200 (or the power receiving coil 210) is placed (or arranged) within the placement surface R1 of the magnetic plate N1. That is, it has been found that the arrangement of the power feeding coil L1 and the power receiving coil 210 so that they face each other is not essential for contactless power transmission (or wireless power transmission). It is generally understood that arranging a power feeding coil and a power receiving coil so that they face each other results in a magnetic flux generated in the power feeding coil being interlinked with the power receiving coil to produce an induced electromotive force, thereby performing contactless power transmission (or wireless power transmission). However, the power feeding coil L1 and the power receiving coil 210 do not have to be arranged facing each other, but it is only required that the power feeding coil L1 be installed (or arranged) so that at least one of the two coil surfaces L1a and L1b of the power feeding coil L1 comes into contact with the installation surface R2 of the magnetic plate N1 so as to face the installation surface R2 of the magnetic plate N1, to allow a magnetic flux generated from the power feeding coil L1 to flow into the magnetic plate N1 substantially without the intervention of air and to be radiated into the air from every portion on the magnetic plate N1, thereby forming the power feeding area K on the magnetic plate N1 in such a manner that power is transmitted over a wide range. In addition, it has further been found that setting the range of the power feeding area K as the placement surface R1 of the magnetic plate N1 enables power transmission regardless of where the power receiving device 200 (or the power receiving coil 210) is placed (or arranged) within the placement surface R1 of the magnetic plate N1.

Subsequently, application examples of the power feeding stand D1 according to the first embodiment of the present invention will be described with reference to FIGS. 4 to 7. FIGS. 4 to 7 are schematic diagrams illustrating application examples of the power feeding stand according to the first embodiment of the present invention.

Figure 4:
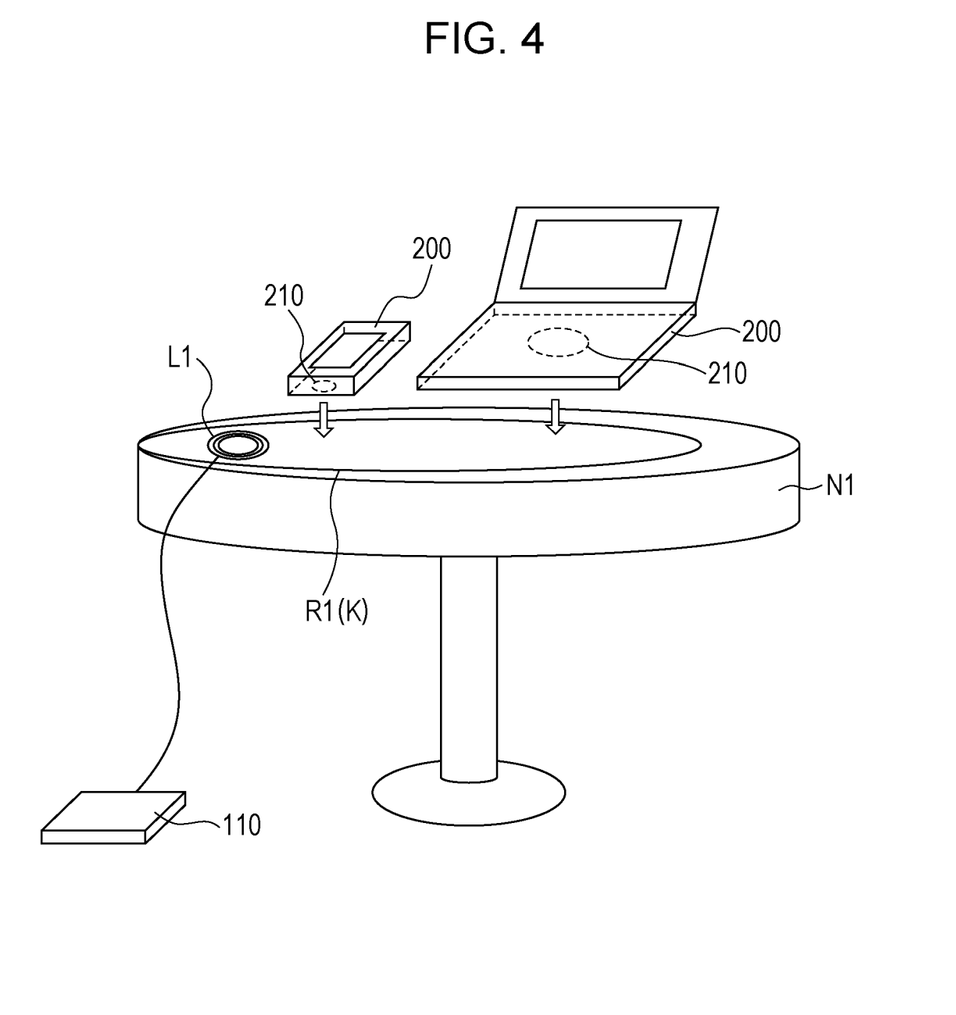
FIG. 4 is a schematic diagram illustrating an application example of the power feeding stand according to the first embodiment of the present invention.

FIG. 4 illustrates an example of the application of the power feeding stand D1 according to the first embodiment of the present invention to a power feeding table. In the illustrated example, a power feeding table is formed of a magnetic body N1, and a placement surface R1 of the magnetic body N1 is defined and formed on the power feeding table. The power feeding coil L1 is installed (or arranged) on the power feeding table, and thus a power feeding area K corresponding to the placement surface R1 is formed on the power feeding table. In addition, when a power receiving device 200 (or a power receiving coil 210) is placed (or arranged) within the placement surface R1 (or the power feeding area K) on the power feeding table, the transmission of power to the power receiving device 200 is immediately started without causing an actuator to move the power feeding coil L1. In the illustrated example, the power receiving device 200 is implemented as a mobile device such as a smartphone (or a multi-function feature phone) or an electronic device such as a notebook computer. In addition, as in the illustrated example, the placement surface R1 having a wide area is defined and formed on the power feeding table, also enabling power to be simultaneously fed into a plurality of power receiving devices 200.

Figure 5:
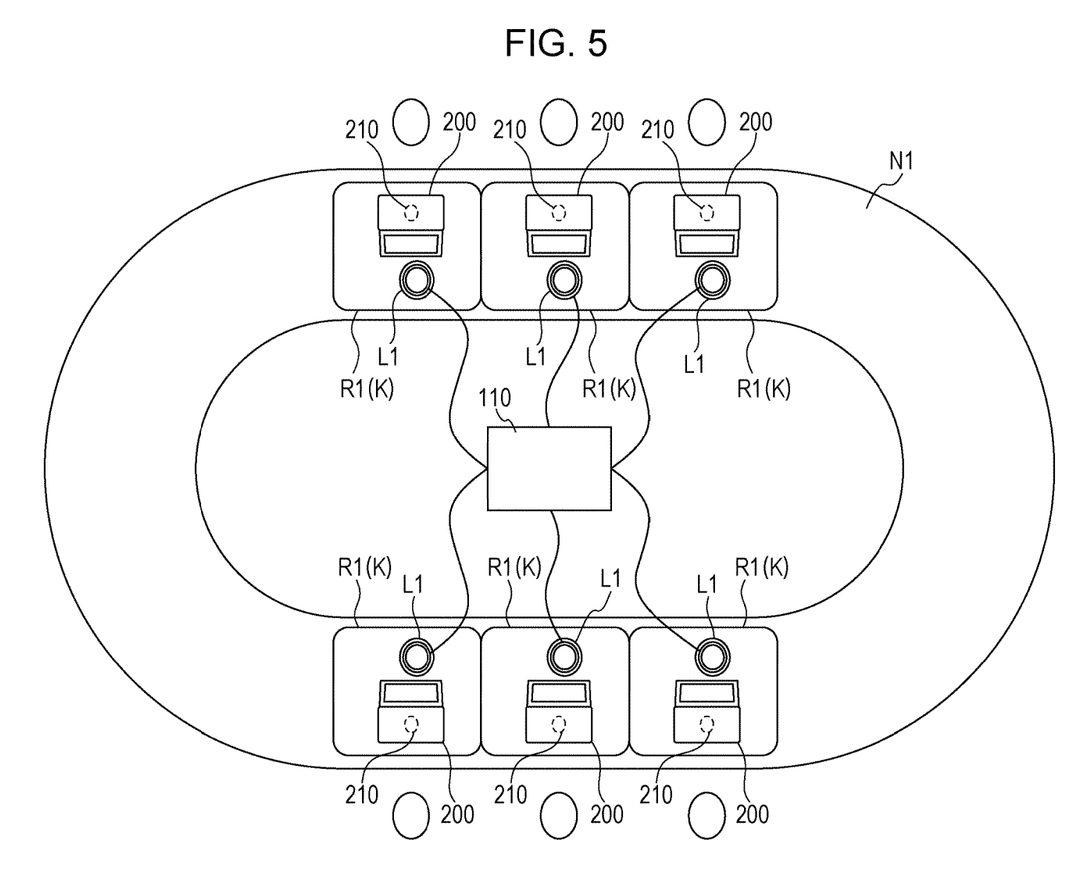
FIG. 5 is a schematic diagram illustrating another application example of the power feeding stand according to the first embodiment of the present invention.

FIG. 5 illustrates an example of the application of the power feeding stand D1 according to the first embodiment of the present invention to a conference table. In the illustrated example, the conference table is implemented as an ellipse-shaped round table with a hollow center. The round table is formed of a magnetic plate N1, and placement surfaces R1 of the magnetic plate N1 are defined and formed on the round table. In the illustrated example, six placement surfaces R1 are defined and formed on the round table. Six power feeding coils L1 are installed (or arranged) on the round table, and thus six power feeding areas K corresponding to the six placement surfaces R1 are formed on the round table. In addition, when power receiving devices 200 (or power receiving coils 210) are placed (or arranged) within the placement surfaces R1 (the power feeding areas K) on the round table, the transmission of power to the power receiving devices 200 is immediately started without causing an actuator to move the power feeding coils L1. In the illustrated example, each of the power receiving devices 200 is implemented as an electronic device such as a notebook computer. In addition, as in the illustrated example, a plurality of power feeding coils L1 may be installed (or arranged) on the round table to form a plurality of power feeding areas K (or a plurality of placement surfaces R1), achieving a round table with convenience improved in accordance with the number of users. Note that, in a case where a plurality of power feeding coils L1 are used, each of the power feeding coils L1 may be provided with a power source section 110 to supply power to the corresponding one of the power feeding coils L1, or, as in the illustrated example, a single power source section 110 may be provided to supply power individually to the power feeding coils L1.

Figure 6:
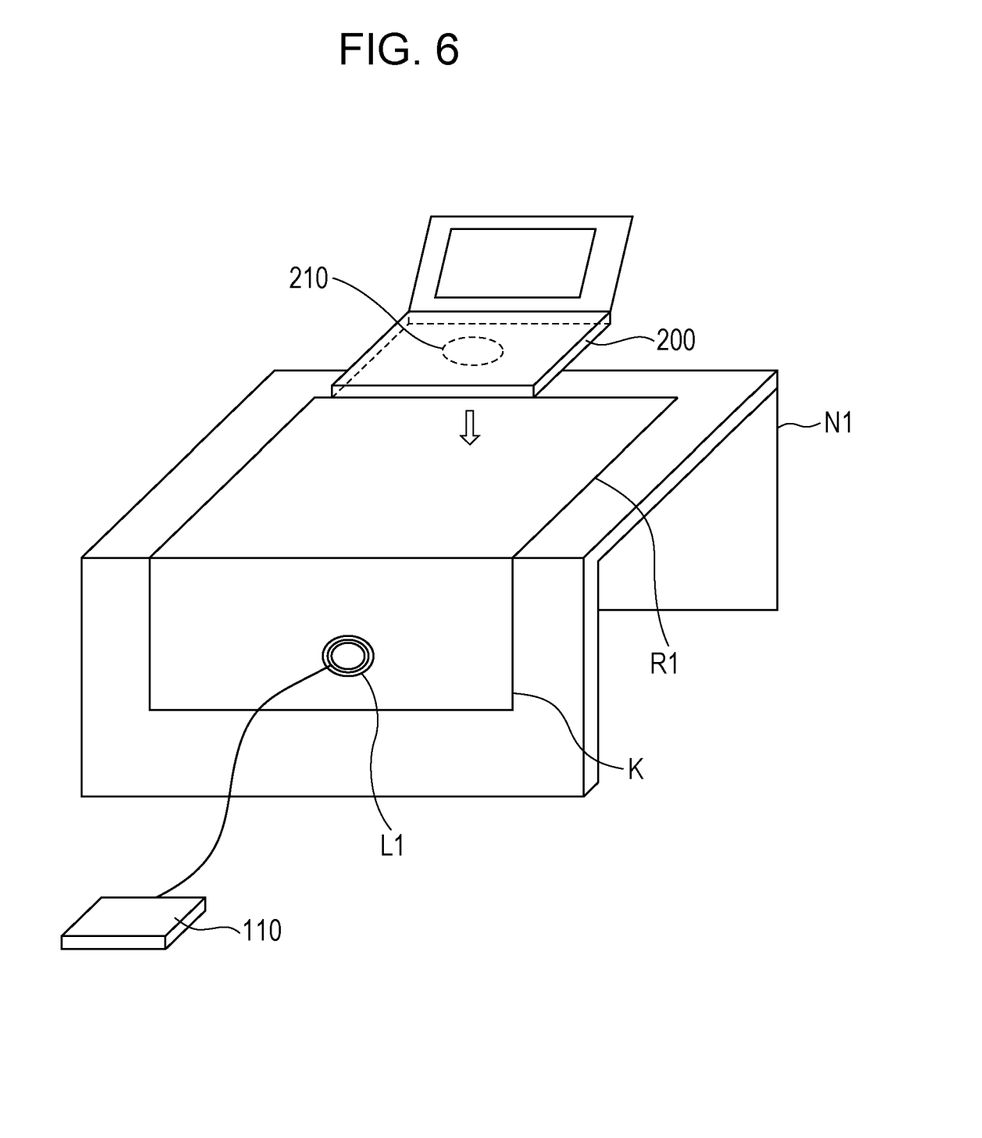
FIG. 6 is a schematic diagram illustrating another application example of the power feeding stand according to the first embodiment of the present invention.

FIG. 6 illustrates an example of the application of the power feeding stand D1 according to the first embodiment of the present invention to a U-shaped table. The U-shaped table has first and second plates extending vertically from the ground, and a third plate connecting the first plate and the second plate. In the illustrated example, the U-shaped table is formed of a magnetic plate N1, and a placement surface R1 of the magnetic plate N1 is defined and formed on the third plate of the U-shaped table. A power feeding coil L1 is installed (or arranged) on the first plate or second plate of the U-shaped table, enabling a power feeding area K to be formed on the first plate or second plate of the U-shaped table and on the area corresponding to the placement surface R1 on the third plate. In addition, when a power receiving device 200 (or a power receiving coil 210) is placed (or arranged) within the placement surface R1 (or a portion of the power feeding area K) on the third plate of the U-shaped table, the transmission of power to the power receiving device 200 is immediately started without causing an actuator to move the power feeding coil L1. In the illustrated example, the power receiving device 200 is implemented as an electronic device such as a notebook computer. In addition, as in the illustrated example, installing (or arranging) the power feeding coil L1 on the first plate or second plate, which is different from the third plate on which the placement surface R1 of the U-shaped table is located, can expand a power feeding area (or placement range) within which power can be transmitted to the power receiving device 200.

Figure 7:
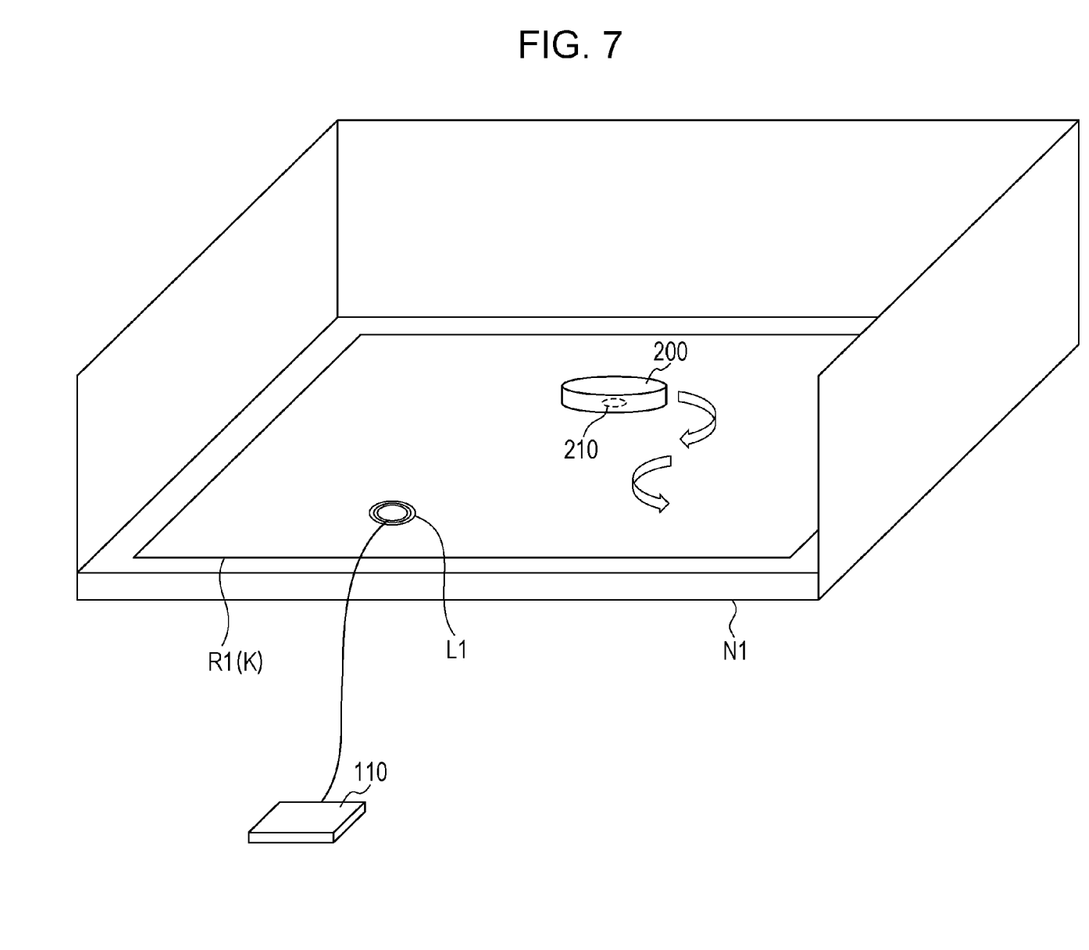
FIG. 7 is a schematic diagram illustrating another application example of the power feeding stand according to the first embodiment of the present invention.

FIG. 7 illustrates an example of the application of the power feeding stand D1 according to the first embodiment of the present invention to a floor of a house or the like. In the illustrated example, the floor is formed of a magnetic plate N1, and a placement surface R1 of the magnetic plate N1 is defined and formed on the floor. A power feeding coil L1 is installed (or arranged) on the floor, and thus a power feeding area K corresponding to the placement surface R1 is formed on the floor. In addition, when a power receiving device 200 is placed within the placement surface R1 (or the power feeding area K) on the floor, the transmission of power to the power receiving device 200 is immediately started without causing an actuator to move the power feeding coil L1. In the illustrated example, the power receiving device 200 is implemented as an autonomously movable electronic device such as a vacuum cleaner.

As described above, the power feeding stand D1 according to this embodiment includes the magnetic plate N1 having the installation surface R2 where the power feeding coil L1 is to be installed (or arranged), and the placement surface R1 where the power receiving device 200 (or the power receiving coil 210) is to be placed (or arranged), and the power feeding coil L1 is installed (or arranged) in such a manner that at least one of the two coil surfaces L1a and L1b faces the installation surface R2. That is, the power feeding coil L1 and the power receiving device 200 are arranged at positions on a main surface of the magnetic plate N1. Thus, a magnetic flux generated from the power feeding coil L1 flows into the magnetic plate N1 from the installation surface R2 of the magnetic plate N1 (or from the location on the main surface where the power feeding coil L1 is arranged), and circulates so that the magnetic flux is radiated into the air from the entire surface of the magnetic plate N1 including the placement surface R1 (or the area on the main surface where the power receiving device 200 can be arranged) and reaches (or returns to) the power feeding coil L1. In this case, the power feeding area K (or the placement surface R1) is formed within an area other than the location where the power feeding coil L1 is arranged on the main surface of the magnetic plate N1. In addition, when the power receiving device 200 (or the power receiving coil 210) is placed (or arranged) within the placement surface R1 (or the power feeding area) defined on the main surface of the magnetic plate N1, the magnetic flux radiated from the surface (or main surface) of the magnetic plate N1 is interlinked with the power receiving coil 210 included in the power receiving device 200, and an induced electromotive force is produced. Accordingly, placing (or arranging) the power receiving device 200 (or the power receiving coil 210) on the placement surface R1 (or power feeding area) of the magnetic plate N1 results in the immediate start of transmission of power to the power receiving device 200 without causing an actuator to move the power feeding coil L1. In consequence, unnecessary power consumption (power consumption by the actuator) can be suppressed, and response before the start of transmission of power to the power receiving device 200 can be increased.

In the power feeding stand D1 according to this embodiment, furthermore, the power receiving coil 210 is arranged at a certain position on either of the two main surfaces of the magnetic plate N1, and the position at which the power feeding coil L1 is arranged is different from the position at which the power receiving coil 210 is arranged. That is, the power receiving coil 210 is arranged at a certain position other than the location on either of the two main surfaces of the magnetic plate N1 where the power feeding coil L1 is arranged, and the area of the placement surface R1 is larger than the area of the installation surface R2. This can increase the flexibility with which the power receiving device 200 (or the power receiving coil 210) is placed (or arranged) on the power feeding stand D1. Accordingly, it is possible to expand a power feeding area (or placement range) within which power can be transmitted to the power receiving device 200.

Second Embodiment

Figure 8:
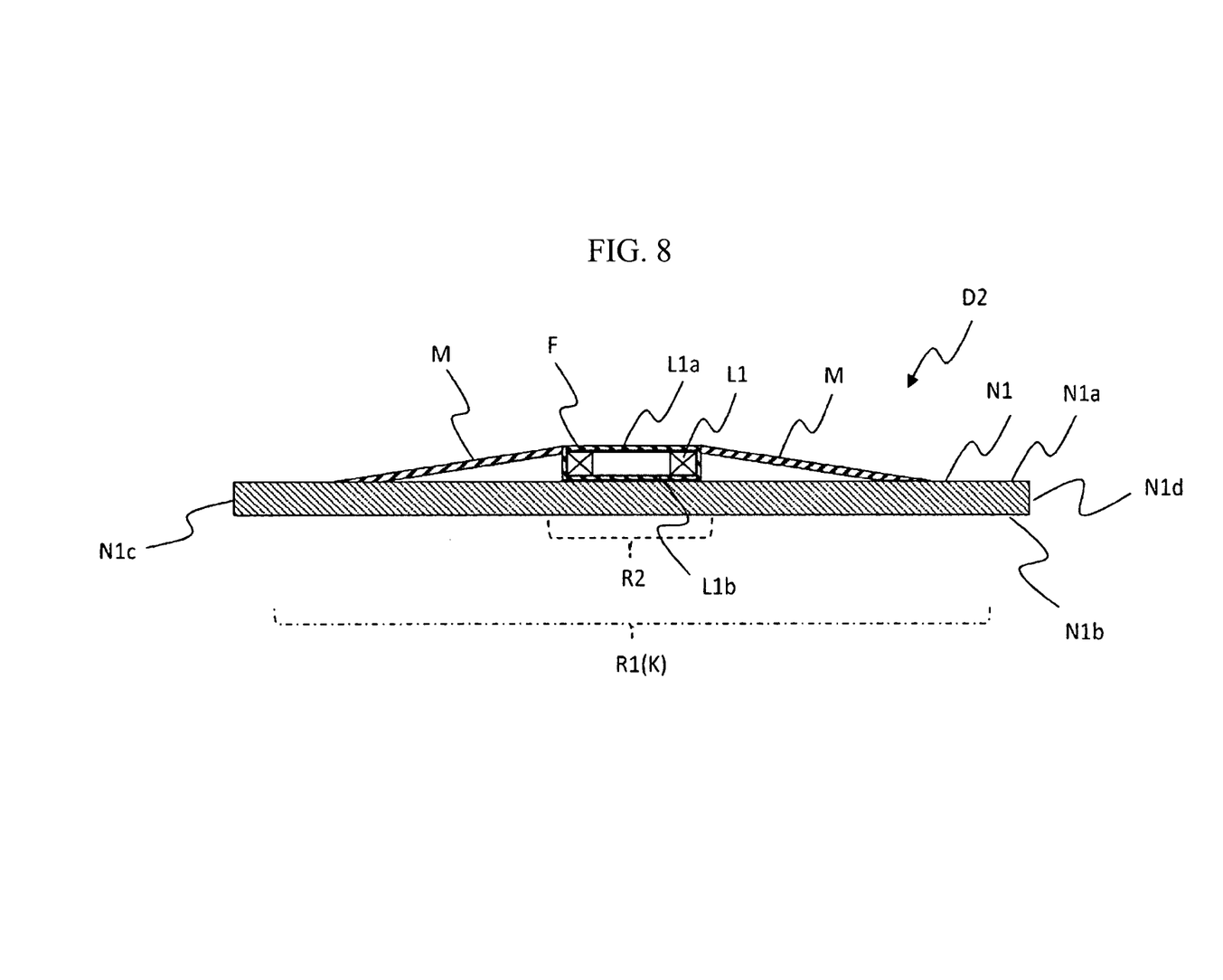
FIG. 8 is a cross-sectional view of a power feeding stand according to a second embodiment of the present invention, which corresponds to the cross-sectional view of the power feeding stand according to the first embodiment of the present invention illustrated in FIG. 3.

Next, the configuration of a power feeding stand D2 according to a second embodiment of the present invention will be described with reference to FIG. 8. FIG. 8 is a cross-sectional view of the power feeding stand according to the second embodiment of the present invention, which corresponds to the cross-sectional view of the power feeding stand according to the first embodiment of the present invention illustrated in FIG. 3. The power feeding stand D2 according to the second embodiment is different from the power feeding stand D1 according to the first embodiment in that the power feeding stand D2 further includes a non-magnetic plate M. In the following, a description will focus on the difference from the first embodiment.

As illustrated in FIG. 8, the power feeding stand D2 includes a magnetic plate N1, a power feeding coil L1, and the non-magnetic plate M. The magnetic plate N1 and the power feeding coil L1 have a configuration similar to that in the power feeding stand D1 according to the first embodiment.

The non-magnetic plate M is disposed on the placement surface R1 of the magnetic plate N1. Specifically, the non-magnetic plate M is inclined so that the non-magnetic plate M is higher at a position near the installation surface R2 of the magnetic plate N1. In other words, the non-magnetic plate M is disposed so that the nearer it is to the installation surface R2, the greater the height of the non-magnetic plate M, whereas, the farther it is from the installation surface R2, the smaller the height of the non-magnetic plate M. In addition, the power receiving device 200 (or the power receiving coil 210) is placed (or arranged) on the non-magnetic plate M disposed over the placement surface R1 of the magnetic plate N1. That is, the power receiving device 200 (or the power receiving coil 210) is placed (or arranged) on the placement surface R1 of the magnetic plate N1 in such a manner that the non-magnetic plate M is located between the power receiving device 200 and the placement surface R1. In this case, the distance between the power receiving device 200 and the magnetic plate N1 is different for the power receiving device 200 placed on the non-magnetic plate M located at a position close to the installation surface R2 of the magnetic plate N1 and the power receiving device 200 (or the power receiving coil 210) placed (or arranged) on the non-magnetic plate M located at a position away from the installation surface R2 of the magnetic plate N1. As described above, the amount of power fed into the power feeding area K formed within the placement surface R1 varies with the distance from the installation surface R2. Specifically, the amount of power fed into the placement surface R1 located in close proximity to the installation surface R2 is large, whereas the amount of power fed into the placement surface R1 located away from the installation surface R2 is small. In this embodiment, the power receiving device 200 (or the power receiving coil 210) placed (or arranged) on the non-magnetic plate M located at a position close to the installation surface R2 of the magnetic plate N1 is spaced away from the magnetic plate N1, resulting in a reduction in the amount of power received by the power receiving device 200 (or the power receiving coil 210), compared with when the power receiving device 200 (or the power receiving coil 210) is directly placed (or arranged) on the placement surface R1 of the magnetic plate N1. Accordingly, the variations in the amount of power received by the power receiving device 200 (or the power receiving coil 210) placed (or arranged) on the placement surface R1 close to the installation surface R2 of the magnetic plate N1 and the amount of power received by the power receiving device 200 (or the power receiving coil 210) placed (or arranged) on the placement surface R1 away from the installation surface R2 of the magnetic plate N1 can be reduced.

As described above, the power feeding stand D2 according to this embodiment further includes the non-magnetic plate M disposed on the placement surface R1, and the non-magnetic plate M is inclined so that the non-magnetic plate M is higher at a position near the installation surface R2. This can suppress the variation in the amount of power fed into the power feeding area K within the placement surface R1, which varies with the distance from the installation surface R2. Accordingly, the amount of power fed into the placement surface R1 can be made uniform.

Third Embodiment

Figure 9:
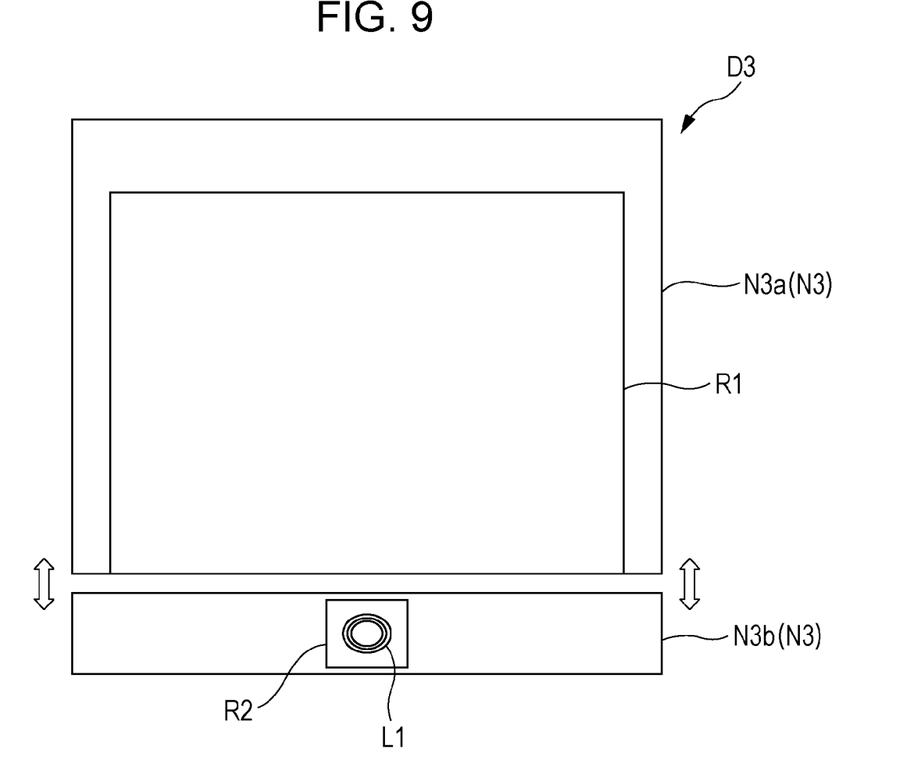
FIG. 9 is a plan view of a power feeding stand according to a third embodiment of the present invention.
Figure 10:
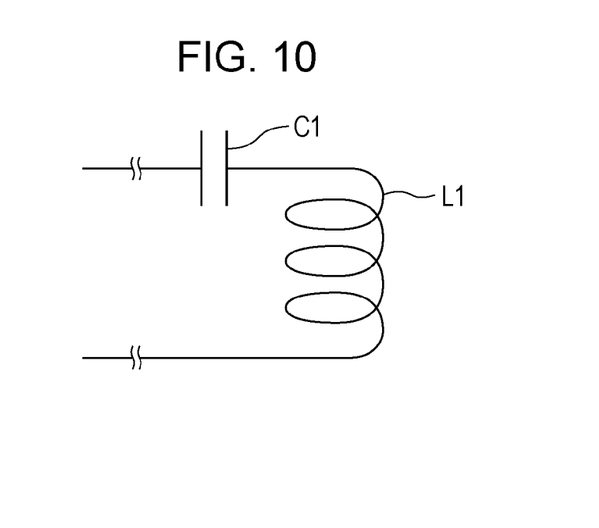
FIG. 10 is a schematic circuit configuration diagram illustrating a circuit configuration of a power feeding coil and a power feeding side resonant capacitor in the power feeding stand according to the third embodiment of the present invention.

Next, the configuration of a power feeding stand D3 according to a third embodiment of the present invention will be described with reference to FIGS. 9 and 10. FIG. 9 is a plan view of the power feeding stand according to the third embodiment of the present invention. FIG. 10 is a schematic circuit configuration diagram illustrating the circuit configuration of a power feeding coil and a power feeding side resonant capacitor in the power feeding stand according to the third embodiment of the present invention. The power feeding stand D3 according to the third embodiment is different from the power feeding stand D1 according to the first embodiment in that the power feeding stand D3 further includes a power feeding side resonant capacitor C1 and in that the power feeding stand D3 has a magnetic plate N3 having a different shape. In the following, a description will focus on the difference from the first embodiment.

The power feeding stand D3 includes the magnetic plate N3, a power feeding coil L1, and the power feeding side resonant capacitor C1. The power feeding coil L1 has a configuration similar to that in the power feeding stand D1 according to the first embodiment.

Like the magnetic plate N1 according to the first embodiment, the magnetic plate N3 is composed of a magnetic body formed into a plate shape. In this embodiment, as illustrated in FIG. 9, the magnetic plate N3 has a first portion N3a and a second portion N3b, and the first portion N3a and the second portion N3b are separate from each other. The first portion N3a of the magnetic plate N3 has a placement surface R1 where the power receiving device 200 (or the power receiving coil 210) is to be placed (or arranged), and the second portion N3b of the magnetic plate N3 has an installation surface R2 where the power feeding coil L1 is to be installed. That is, the magnetic plate N3 is split into the installation surface R2 and the placement surface R1. In this embodiment, furthermore, a distance between the first portion N3a of the magnetic plate N3 and the second portion N3b of the magnetic plate N3 is adjustable. That is, a distance between the installation surface R2 of the magnetic plate N3 and the placement surface R1 of the magnetic plate N3 is adjustable. Here, a mechanism for adjusting the distance between the first portion N3a of the magnetic plate N3 and the second portion N3b of the magnetic plate N3 may be such that the distance is adjusted by hand or by using an actuator such as a servo motor.

As illustrated in FIG. 10, the power feeding side resonant capacitor C1 is connected to the power feeding coil L1. In this embodiment, the power feeding side resonant capacitor C1 is connected in series with the power feeding coil L1 to form a resonant circuit. The power feeding side resonant capacitor C1 has a function of adjusting the resonant frequency of the resonant circuit formed by the power feeding coil L1 and the power feeding side resonant capacitor C1. Examples of the power feeding side resonant capacitor C1 include a low-dielectric-constant capacitor having a low dielectric loss tangent tan δ for an improvement in power transmission efficiency. In addition, matching the resonant frequency of the resonant circuit formed by the power feeding coil L1 and the power feeding side resonant capacitor C1 with the resonant frequency of a resonant circuit formed by the power receiving coil 210 of the power receiving device 200 and a power receiving side resonant capacitor (not illustrated) makes it possible to implement power transmission based on a magnetic resonance method. In this case, the magnetic-field resonance between the resonant circuit formed by the power feeding coil L1 and the power feeding side resonant capacitor C1 and the resonant circuit formed by the power receiving coil 210 and the power receiving side resonant capacitor (not illustrated) maximizes power transmission efficiency. In this embodiment, the power feeding side resonant capacitor C1 is connected in series with the power feeding coil L1. However, this is not meant to be limiting, and the power feeding side resonant capacitor C1 may be connected in parallel to the power feeding coil L1. Alternatively, series connection and parallel connection may be used in combination.

As described above, the power feeding stand D3 according to this embodiment further includes the power feeding side resonant capacitor C1 connected to the power feeding coil L1 to form a resonant circuit, and is configured such that the magnetic plate N3 is split into the installation surface R2 and the placement surface R1 and a distance between the installation surface R2 and the placement surface R1 is adjustable. Thus, the inductance value of the power feeding coil L1 varies with the distance between the installation surface R2 and the placement surface R1, enabling fine adjustment of the resonant frequency of the resonant circuit formed by the power feeding coil L1 and the power feeding side resonant capacitor C1.

The present invention has been described with reference to embodiments thereof. It is to be understood by those skilled in the art that the embodiments are illustrative and various modifications and changes can be made within the claims of the present invention without departing from the scope of the present invention and such modifications and changes also fall within the claims of the present invention. Therefore, the description and drawings should be taken in an illustrative or diagrammatic sense only and not in any limiting sense.

REFERENCE SIGNS LIST

100 . . . power feeding device; 110 . . . power source section; 110a . . . power source; 110b . . . power conversion circuit; 200 . . . power receiving device; 210 . . . power receiving coil; 220 . . . rectifier circuit; 230 . . . load; C1 . . . power feeding side resonant capacitor; D, D1 to D3 . . . power feeding stand; F . . . insulating film; K . . . power feeding area; L1 . . . power feeding coil; L1a, L1b . . . coil surface; M . . . non-magnetic plate; N1, N3 . . . magnetic plate; N1a . . . first main surface; N1b . . . second main surface; N1c . . . first side surface; N1d . . . second side surface; N1e . . . third side surface; N1f . . . fourth side surface; N3a . . . first portion; N3b . . . second portion; R1 . . . placement surface; R2 . . . installation surface; and S1 . . . contactless power transmission device.

What is claimed is:

1. A power feeding device for wireless transmission of power to a power receiving device including a power receiving coil, comprising:
   a magnetic body having a flat plate shape with opposing flat, planar and parallel surfaces joined by edges; and
   a power feeding coil that is arranged at a first position on the opposing flat, planar and parallel surfaces of the magnetic body,
   wherein the power receiving coil is arranged at a second position on the opposing flat, planar and parallel surfaces of the magnetic body during power transmission, and the first position is different from the second position.

2. The power feeding device according to claim 1, wherein the power feeding coil includes an insulation-coated conductor wound therearound.

3. The power feeding device according to claim 1, wherein the magnetic body includes an insulating film that coats an outer surface of the magnetic body.

4. The power feeding device according to claim 1, wherein the power feeding coil and the power receiving coil are both arranged on one of the opposing flat, planar and parallel surfaces of the magnetic body.

5. The power feeding device according to claim 1, wherein the power feeding coil is arranged so that a central axis thereof is substantially perpendicular to the opposing flat, planar and parallel surfaces of the magnetic body.

6. The power feeding device according to claim 1, wherein:
   the power feeding coil has two planar, parallel surfaces; and
   one of the two planar, parallel surfaces of the power feeding coil faces one of the opposing flat, planar and parallel surfaces of the magnetic body.

* * * * *